United States Patent

[11] 3,552,553

| [72] | Inventor | James E. Reading<br>Sepulveda, Calif. |
|------|----------|---------------------------------------|
| [21] | Appl. No.| 673,405 |
| [22] | Filed    | Oct. 6, 1967 |
| [45] | Patented | Jan. 5, 1971 |
| [73] | Assignee | Torite Enterprises, Inc.<br>San Fernando, Calif.<br>a corporation of California |

[54] DUAL MEDIA FILTRATION CARTRIDGE
19 Claims, 5 Drawing Figs.

[52] U.S. Cl. .................................................. 210/484,
210/489, 210/493
[51] Int. Cl. .............................................. B01d 27/06
[50] Field of Search ........................................ 210/489-
—494, 484, 496

[56] References Cited
UNITED STATES PATENTS

| 2,837,032 | 6/1958 | Horsting | 210/489X |
| 3,115,459 | 12/1963 | Giesse | 210/484 |
| 3,290,870 | 12/1966 | Jensen | 210/489X |
| 3,397,793 | 8/1968 | MacDonnell | 210/484X |

FOREIGN PATENTS

| 892,663 | 3/1962 | Great Britain | 210/489 |

Primary Examiner—John W. Adee
Attorney—Victor Sepulveda

ABSTRACT: A fluid filter cartridge which includes a dual stage filtration media, the first stage of which is a precleaner of depth medium composed of a foamlike material for removing contamination of a first predetermined fineness and a second stage surface medium which may be composed of a pleated paper or felt-type media which removes contaminations passed by the first stage filter. The cartridge is further characterized by the foamlike medium having convolute structural configuration on one surface thereof which causes the material of the foamlike medium to bear evenly on the pleated paper filter media.

PATENTED JAN 5 1971
3,552,553
SHEET 1 OF 2
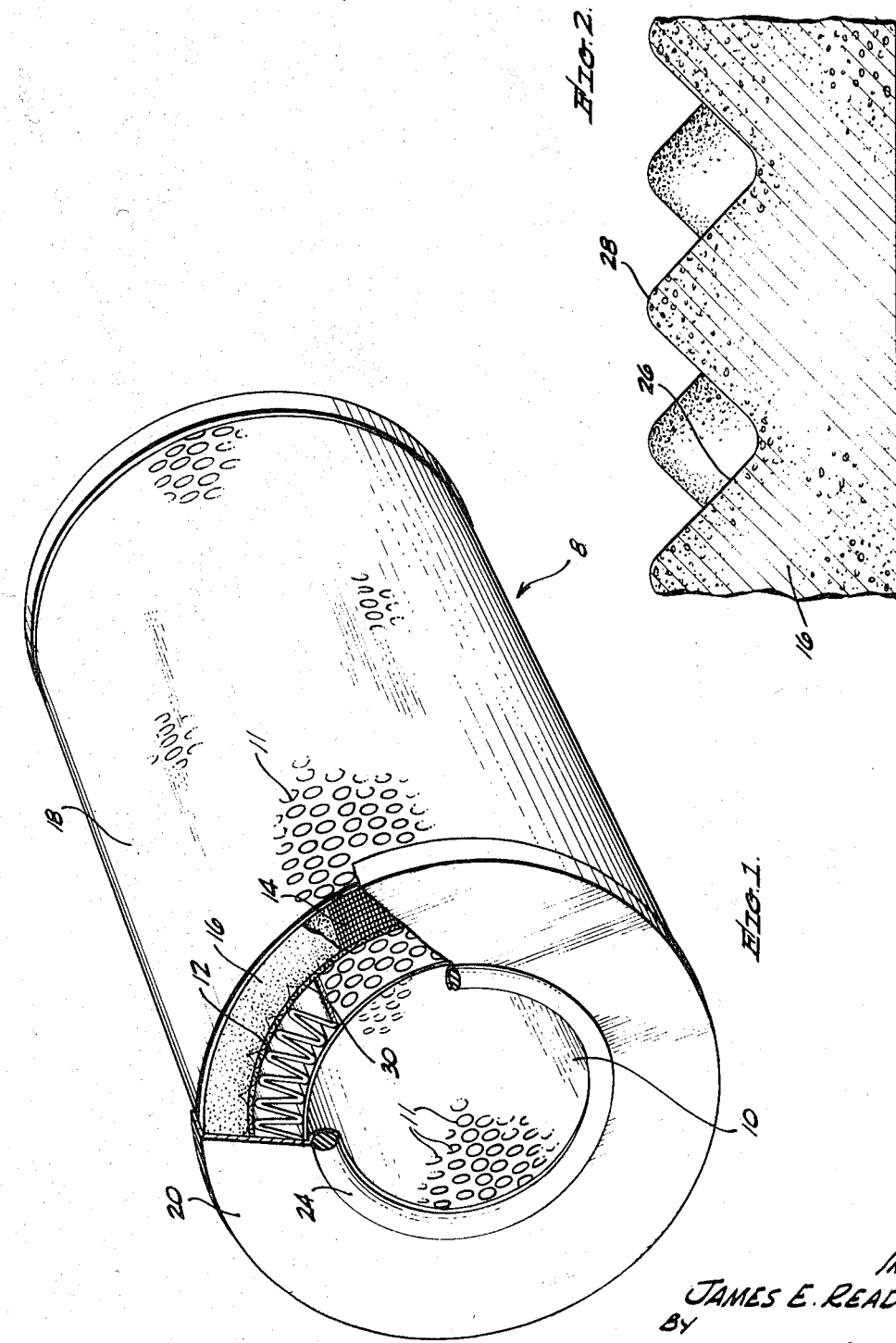
INVENTOR.
JAMES E. READING,
BY
Victor Sepulveda
AGENT.

INVENTOR.
JAMES E. READING,
BY
AGENT.

DUAL MEDIA FILTRATION CARTRIDGE

BACKGROUND OF THE INVENTION

This invention related to filtration systems and more particularly to a novel and improved replaceable cartridge for fluid filtration systems or the like.

Heretofore fluid filtration systems, either gaseous or liquid, have comprised a replaceable cartridge which is insertable within a housing and which filters the fluids passed therethrough to remove particles of contaminations or the like before the fluid is introduced into other systems such as internal combustion engines, hydraulic systems, or the like.

The aforesaid prior art devices have been constructed of a number of different materials such as paper, fibrous, metallic and elastomer materials, as examples of only a few, plus the combinations of these materials, for either depth or surface-type filters. The construction of these materials is normally tubular in shape, but not limited thereto, and the aforesaid filtration materials are wrapped around a screenlike or perforated center core which defines a center opening. In normal operation the fluid to be filtered, such as air, for example, flows into the filter housing through the filtration material and exits through an outlet port within the center core of the cartridge. In reverse flow systems, the reverse of this procedure is followed.

These aforesaid prior art filters operate with limited filtration and limited life and must be replaced at frequent intervals. Such limited life may add an increase in cost by the frequent replacement thereof. Too, the fact that these inferior filters will pass some particles of contamination, especially when their limited life span has neared completion, will cause the systems, for which they are designed to protect, to again be unprotected and damage and wear will again commence within the equipment.

Thus, it can be seen that a need has developed for a filter device either permanent or preferably replaceable which is contained in a single package for ease in removing and replacing the cartridge which has extended life and which can be easily cleaned.

SUMMARY OF THE INVENTION

Briefly described, the present invention comprises a replaceable filter cartridge which has a final filtration element which may be comprised of convolutely folded fibrous material and is positionably mounted about a perforated tubular core which supports the fibrous element. A primary filtration element comprising an open-cell urethane foam structure which includes at least one surface defining a plurality of spaced concave portions which is inwardly positioned adjacent and around the pleated fiber filter to form a dual media filtration unit. End members are positioned on either end of the primary core and are adapted to hold the two filtration units in position and seal the unit for confining the filtered fluid within the unit. The foam material which defined the concave portions brings to bear the raised portions as a result thereof upon the pleated corners of the fibrous filter to provide a compact structure.

It therefore becomes one object of this invention to provide a novel and improved replaceable filter cartridge.

Another object of this invention is to provide a novel and improved filter which has a longer life expectancy and yet has improved filter qualities.

Another object of this invention is to provide a novel and improved filter which is compact and enveloped in a stable and secure structure.

Another object of this invention is to provide a novel and improved dual stage filtration cartridge which includes a depth medium for capturing a large percentage of the contaminations and which has a high contamination capacity and a surface medium which captures the final contaminations passed by the depth media.

These and other objects, features and advantages will become apparent to those skilled in the art when taken in consideration with the following detailed description which describes but one preferred embodiment of this invention and wherein like reference numerals indicate like or corresponding parts throughout the several views and wherein:

FIG. 1 is a perspective view of one preferred embodiment of this invention with a cutaway portion showing interior sections thereof;

FIG. 2 is a partial view of one of the filter medium of the preferred embodiment;

DESCRIPTION OF PREFERRED EMBODIMENTS

Figure 3:
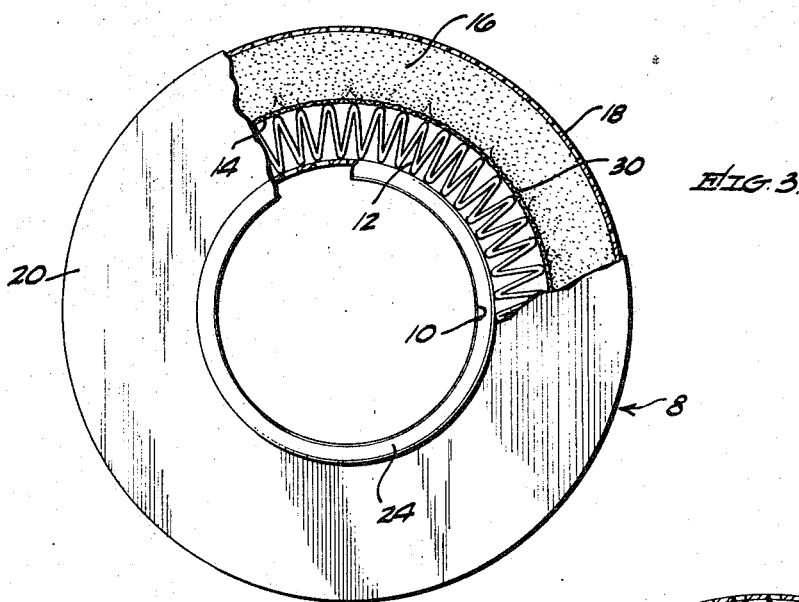
FIG. 3 is an end view of one preferred embodiment of this invention with a cutaway portion showing the interior of the filter medium.

Turning now to a more detailed description of this invention, there is shown in FIG. 1 a filter cartridge 8 which is a preferred embodiment of this invention, and a core member 10 which may be composed of a perforated metallic material for example and in this particular embodiment member 10 has a plurality of openings or holes 11 therein to allow filtered fluid to escape therefrom. The dimensions of core member 10 and the dimensions of filtration openings or holes 11 therein may be of any particular or desired size and in this particular embodiment are shown as small holes for the purpose of the filtered fluid to enter the system to be protected.

Surrounding core member 10 is a final filtration medium 12 which is formed of the familiar pleated or convolute fibrous material such as paper and which has its pleats therein running longitudinal with the longitudinal center axis of core member 10. Such pleated fibrous filtration media are well known to those skilled in the art. Pleated paper 12 is normally porous to provide the final filtration for removing contaminations from the fluids passed therethrough. Surrounding final filtration medium 12 is a screenlike member 14 which provides a foundation for a primary filtration medium 16. Second filtration medium 16 is composed of a foamlike material and is shown in more detail in FIG. 2. And finally surrounding primary filtration medium 16 is a second perforated sleeve member 18 which is an enclosure device similar to core member 10 and is used to encase the entire filtration media within a single cartridge 8.

Filtration cartridge 8 is held in place by end members 20 and 22 which may be in the form of a metallic cap or the like which are used to hold the filtration media in place and are generally sealed thereon to ensure that fluid leakage will not occur but will pass directly through both filter media. It is noted that end members 20 and 22 have portions 21 and 23 which overlap sleeve 18. A rubber seal 24 is provided for placing the cartridge into its respective housing (not shown) and for sealing the cartridge in place.

With reference to FIG. 2, primary filtration medium 16 is shown which may be formed of any type natural or synthetic foams and for the preferred embodiment it may be considered as an ester-type polyurethane such as the type which may be purchased from the Scott Paper Co. and which is composed of strands connected by thin membranelike windows in a three-dimensional structure of skeletal strands. Such a foam may be completely open-cell or open-pore structure. The three-dimensional network of interconnecting strand render the foam exceptionally porous and breathable even in very fine pore sizes.

Filtration medium 16 may have one surface with a convolute formation thereon. This convolute formation may be in the form of a plurality of concave areas 26 which leaves a plurality of convex areas 28. This is shown on surface 30 in FIGS. 1, 3 and 4. When filter medium 16 is fitted into filtration cartridge 8, a special shoe or the like may be used wherein convex areas 26 are compressed and come to bear upon screen 14 in a manner to provide a springlike or biasing effect thereon and provide rigidity in the packaging thereof.

Figure 4:
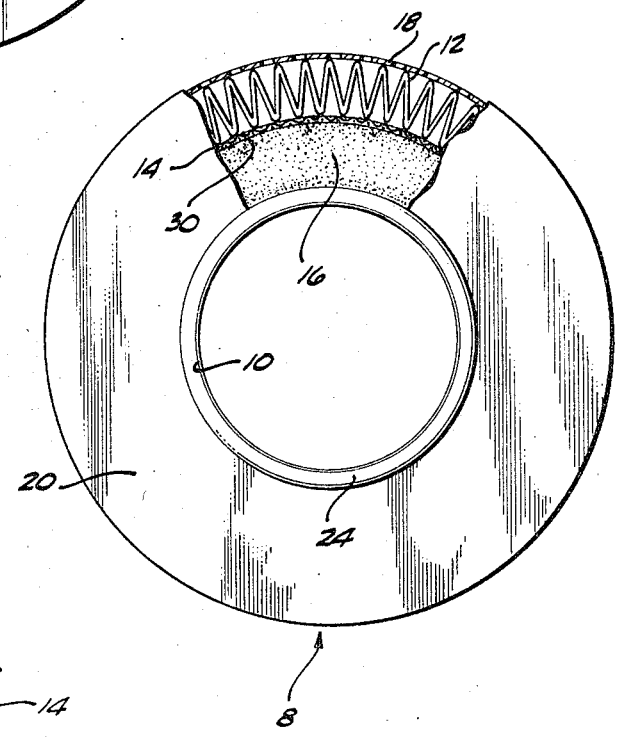
FIG. 4 is a second embodiment of this invention showing a different arrangement of the filter medium therein.

With reference now to FIG. 4 for a filtration system which uses the so-called inside out fluid passage method, the fluid will pass through core member 10 through the primary filtration member which is now the open-cell urethane foam 16 positioned next to core member 10 and through final filtration medium 12 which is now the pleated paper or fibrous material. The embodiment in FIG. 4 illustrates this relative positioning. In this particular configuration note now that the springlike convex areas 28 are brought to bear directly upon screen 14 but pressing outwardly from core member 10.

Figure 5:
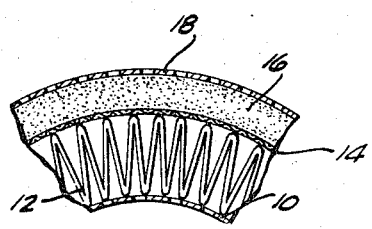
FIG. 5 is a partial section view of a further embodiment of this invention showing a different aspect of the filtration medium.

It has been found that when the device is used in liquid fluid under high pressure, for example in hydraulic systems or the like, that the filtering ability of the urethane foam 16 of the primary stage is inadequate and that a more densely constructed foam is necessary to perform the primary filtration. It has been found that if the urethane foam is compressed under a high pressure, that the same filtration effect takes place but the urethane foam now compressed as shown in FIG. 5 will withstand these high pressures and perform the primary filtration desired.

Thus, there has been shown and described a replaceable filter cartridge which has a final filtration element 12 which is comprised of convolutely folded fiber such as paper and is positionally mounted about the periphery of a perforated tubular core 10 which supports fibrous element 12. A primary filtration media 16 comprising an open-cell urethane foam structure, which includes at least one surface defining a plurality of spaced concave portions 26 which is inwardly positioned adjacent and around the periphery of the convolute paper filter 12 to form the dual filtration unit according to this invention. End members 20 and 22 are positioned on either end of core 10 and are adapted to hold the two filtration units 12 and 16 in position. The foam material which defines the concave portions brings to bear the raised portion 28 as a result thereof upon the pleated corners of fibrous filter medium 12 to provide the compact structure.

It must be understood that many modifications and alterations of this invention may be made without departing from the spirit and scope of this invention, as there has been shown but preferred embodiments thereof.

I claim:

1. A fluid filter cartridge comprising:
an elongated perforated core member having a longitudinal axis;
a final filtration medium being disposed about the periphery of said core member and being comprised of a pleated porous and fibrous material having the pleats thereof extending parallel to the longitudinal axis of said core member; and
a primary filtration medium being disposed about the periphery of said final filtration member, said final filtration member being comprised of an open-cell foamlike structure, said primary filtration medium has one surface thereof having a plurality of convolute configurations protruding therefrom which bear upon said final filtration medium.

2. The fluid filter cartridge as defined in claim 1 and wherein said primary filtration medium is comprised of a resinous foam.

3. The fluid filter cartridge as defined in claim 1 and wherein said primary filtration medium is comprised of a synthetic plastic foam.

4. The fluid filter cartridge as defined in claim 1 wherein said primary filtration medium is comprised of an open-cell polyurethane foam.

5. A fluid filter cartridge comprising:
an elongated perforated core member having a longitudinal axis;
a primary filter medium being disposed about the periphery of said core member and comprising an open-cell foamlike structure, said primary filtration medium has one surface thereof having a plurality of convolute configurations protruding therefrom which bear upon a final filtration medium; and
a final filtration medium being disposed about the periphery of said primary filtration medium, said final filtration medium comprising a pleated, porous and fibrous material having the pleats thereof extending parallel to the longitudinal axis of said core.

6. The fluid filter cartridge as defined in claim 5 wherein said primary filtration medium is compressed.

7. The filter device as defined in claim 5 wherein said primary filter medium is comprised of a resinous foam.

8. The filter device as defined in claim 5 wherein said primary filter medium is comprised of a synthetic plastic foam.

9. the fluid device as defined in claim 5 wherein said primary filter medium is comprised of an open-cell polyurethane foam.

10. A filter device comprising:
an inner perforated tubular core, said inner core being substantially elongated along a center axis;
a final filtration medium being formed of a fibrous material and having a plurality of accordion pleats therein, said final filtration medium being substantially cylindrically shaped and disposed about the periphery of said inner core, wherein the pleats of said final filtration medium being disposed substantially parallel to the center axis of said inner core;
a primary filtration medium being formed of an open-cell, foamlike structure and being cylindrically shaped and disposed about the periphery of the said final medium; and
said final filtration medium having a plurality of protrusions on one surface thereof which forms a springlike structure which bears upon said final filtration medium.

11. The filter device as defined in claim 10 and further comprising a screen member being disposed between said final filtration medium and said primary filtration medium.

12. The filter device as defined in claim 10 wherein said primary filter medium is comprised of a resinous foam.

13. The filter device as defined in claim 10 wherein said primary filter medium is comprised of a synthetic plastic foam.

14. The filter medium as defined in claim 10 wherein said primary filter medium is formed of an open-cell polyurethane foam.

15. A filter device comprising:
an inner perforated tubular core, said inner core being substantially elongated along a center axis;
a primary filter medium being formed of a fibrous material and having a plurality of accordion pleats therein, said primary filter medium being substantially cylindrically shaped and disposed about the periphery of said inner core wherein the pleats of said final filter medium being positioned substantially parallel to the center axis of said inner core;
a final filtration medium being formed of an open-cell, foamlike structure and being cylindrically shaped and disposed about the periphery of said primary medium, said final medium having a plurality of protrusions on one surface thereof which forms a springlike structure which bears upon said primary filter medium;
an outer perforated tubular sleeve, said outer sleeve being disposed about the outer periphery of said final filter medium; and
a pair of end members being disposed at either end of the filter device and attached to the inner core and said outer sleeve for substantially sealing said filter device therein.

16. The filter device as defined in claim 15 and further comprising a screen member being disposed between the final filter medium and said primary filter medium.

17. The filter device as defined in claim 15 wherein said primary filter medium is comprised of a resinous foam.

18. The filter device as defined in claim 15 wherein said filter medium is comprised of a synthetic plastic foam.

19. The filter device as defined in claim 15 wherein said primary filter medium is comprised of an open-cell polyurethane foam.

PO-1050
(5/69)

UNITED STATES PATENT OFFICE
CERTIFICATE OF CORRECTION

Patent No. 3,552,553                Dated  January 5, 1971

Inventor(s) JAMES E. READING

It is certified that error appears in the above-identified patent and that said Letters Patent are hereby corrected as shown below:

Claim 1, column 3, line 55, change "final" second instances to --primary--;

Claim 10, Column 3, line 33, delete "final" and insert

--primary--;

Claim 15, column 2, line 48, delete "primary" and insert

--final--;

column 2, line 50, delete "primary" and insert

--final--;

Column 3, line 56, delete "final" and insert

--primary--;

column 3, line 58, delete "primary" and insert

--final--;

column 3, line 59, delete "final" and insert

--primary--;

column 4, line 63, delete "final" and insert

--primary--;

Claim 18, column 1, line 73, after "said insert --primar

Signed and sealed this 7th day of March 1972.

(SEAL)
Attest:

EDWARD M. FLETCHER, JR.                ROBERT GOTTSCHALK
Attesting Officer                      Commissioner of Patents